United States Patent
Fisher et al.

(10) Patent No.: US 8,488,762 B2
(45) Date of Patent: Jul. 16, 2013

(54) PROGRAM-SPECIFIC PRESENCE

(75) Inventors: Jerald C. Fisher, Fort Collins, CO (US); Karen E. Thayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 12/533,597

(22) Filed: Jul. 31, 2009

(65) Prior Publication Data

US 2011/0025820 A1 Feb. 3, 2011

(51) Int. Cl.
*H04M 3/42* (2006.01)

(52) U.S. Cl.
USPC .................................................. 379/201.1

(58) Field of Classification Search
USPC ..................................................... 379/201.1
See application file for complete search history.

(56) References Cited

U.S. PATENT DOCUMENTS

| | | | |
|---|---|---|---|
| 6,735,287 B2 | 5/2004 | Vishik et al. | |
| 7,269,162 B1 | 9/2007 | Turner | |
| 7,376,670 B2 | 5/2008 | Badt, Jr. et al. | |
| 2005/0235038 A1 | 10/2005 | Donatella et al. | |
| 2006/0224688 A1 | 10/2006 | Morris | |
| 2007/0003051 A1 | 1/2007 | Kiss et al. | |
| 2007/0268130 A1* | 11/2007 | Yee et al. | 340/540 |

OTHER PUBLICATIONS

M. N. Vakil, "The Enhanced Presence Model," Microsoft Office Communicator 2007, Microsoft Corporation, Sep. 2007, 31 pp.

* cited by examiner

*Primary Examiner* — Alexander Jamal

(57) ABSTRACT

A system and method for providing application specific presence information are disclosed here. A system includes one or more processors, a first communication program executable by the one or more processors, and a second communication program executable the one or more processors. When executed, the first and second communication programs respectively provide a first mode and a second mode of user communication. The second communication program causes the one or more processors to provide user presence information to a communication server. The presence information includes a presence status provided by the first communication program and a separate presence status provided by the second communication program. The separate presence status provided by the second communication program is configured to avoid aggregation, by the communication server, with any other presence status.

20 Claims, 3 Drawing Sheets

PROGRAM-SPECIFIC PRESENCE

BACKGROUND

Numerous different electronic communication services are available to facilitate transfer of business and/or personal information. Some communication services provide real-time data transfer. Telephony, video conferencing, instant messaging, etc. are examples of communication services capable of providing real-time information transfer. Other communication services, such as email, allow for communication at a rate determined by a message recipient. Some communication services may allow a user to select from several available modes of communication based on the availability of an intended recipient of an information transfer. Such systems can track the availability of parties with whom a user may desire to communicate and provide the availability information to the user.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
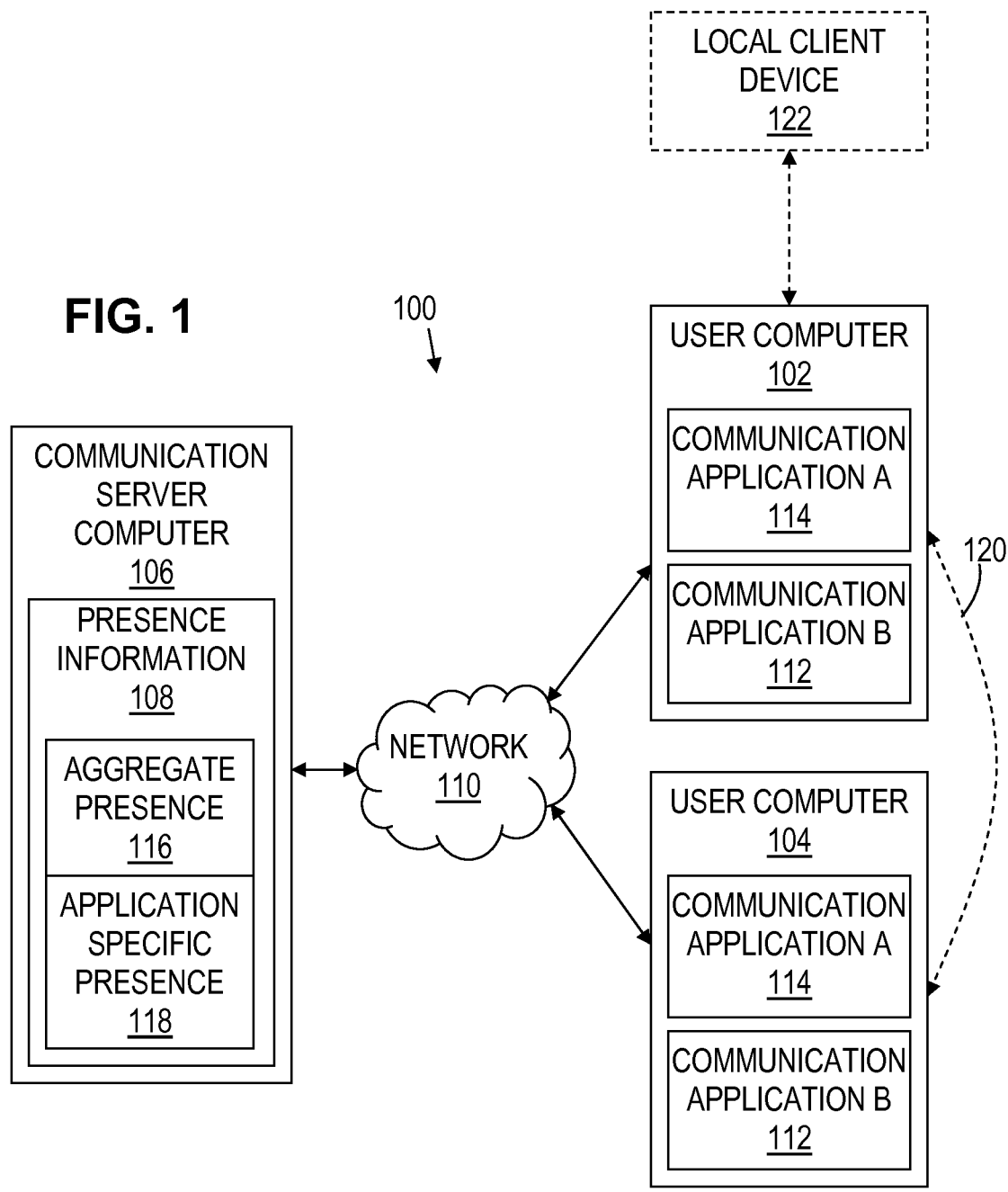
FIG. 1 shows a block diagram of a system that publishes and subscribes to application specific presence in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. More generally, coupling refers to a physical or logical connection of components.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various communication systems provide presence information. Presence information is information that allows a user of a system (e.g., a computer communication system) to determine whether other individuals (i.e., different users of the communication system operating, for example, other computers) are available and/or willing to communicate. The presence information may take the form of a contact list, sometimes called a "buddy list," that catalogs friends, colleagues, associates, etc. of the user. The parties represented in the contact list are generally chosen by the user as persons with whom the user may wish to communicate using a communication mode (i.e., a method of communication) offered by the system. The contact list can provide information regarding each party's availability. For example, a party may be listed as having a presence status of available, busy, offline, inactive, etc. Presence status is a measure of availability. Based on the provided presence status, a user may select a particular communication mode for use with a listed individual. For example, a party having a presence status of available may be a candidate for application of a real-time communication mode such as video-conferencing, while a party having a presence status of offline may be candidate for use of a non-real-time communication mode such as email.

Office Communications Server from Microsoft® ("MSOCS") is an example a communication system that provides presence information with regard to a user's contacts. An application that interoperates with MSOCS must provide a means to receive and process contact information provided by the server. Each MSOCS client (i.e., communication endpoint, e.g., internet protocol phone, computer communication application, mobile computer communication application, etc.) employable by the user publishes presence status to MSOCS. Some clients provide multiple modes of communication and may publish presence status collected from a plurality of sources (e.g., telephone status, calendar information, communication device state, etc.). Other clients may provide more limited functionality, for example, some clients may provide a single mode of communication, such as video conferencing.

MSOCS aggregates presence status related to a user into a single presence value. As a result, when a user becomes not available with regard to a client providing limited functionality, the aggregate presence status provided by MSOCS may be distorted. For example, if a client provides only video conferencing and the user becomes unavailable for video conferencing, MSOCS aggregate availability status may indicate not available for voice over internet protocol ("VOIP") and text chat. Embodiments of the present disclosure provide presence information specific to a particular communication application that is accessible via MSOCS but is not aggregated with presence information provided by other MSOCS clients. Such application-specific presence information allows clients to properly ascertain the availability of communication via a particular communication mode and avoids distortion of aggregated presence.

FIG. 1 shows a block diagram of a system 100 that publishes and subscribes to application specific presence 118 in accordance with various embodiments. The system 100 comprises user computers 102, 104, and a server computer 106 coupled via a network 110. The computers 102-106 may be, for example, desktop computers, notebook computers, rack-mounted servers, hand-held computer based devices, etc. Each computer 102-106 may include one or more processors (e.g., general-purpose microprocessors), storage systems (e.g., semiconductor memory, magnetic storage, optical storage, etc.), user interface systems (e.g., video processing and display, keyboard, mouse, touch-screen, a video camera, etc.), networking systems (e.g., wired or wireless networking), and interconnecting buses. The various storage systems mentioned above, as well as storage media (e.g., optical or magnetic media) constitute computer-readable media by which programming (i.e., instructions) may be provided to the computers 102-106 for execution by the processor included therein.

The network 110 coupling the computers 102-106 may comprise any available computer networking arrangement, for example, a local area network ("LAN"), a wide area network ("WAN"), a metropolitan area network ("MAN"), the internet, etc. Further, the network 104 may comprise any of a variety of networking technologies, for example, wired, wireless, or optical techniques may be employed. Accordingly, the components of system 100 are not restricted to any particular location or proximity to one another, but rather may be located at any distance from one another.

The user computers 102, 104 comprise programming that allows users of the user computers 102, 104 to communicate with one another. The user computers 102, 104 may support a variety of communication modes. For example, the computer 102 may include programming allowing communication via telephony (e.g., voice over internet protocol ("VOIP")), video conferencing, and instant messaging. In some embodiments, the user computers 102, 104 may employ peer-to-peer communication 120 in some communication modes, rather than communication directed through the server 106.

In some embodiments of the system 100, the communication server 106 aggregates presence information pertinent to a user of the user computer 102 into a composite presence status value applicable to all communication modes available via the user computer 102. Such aggregation may prevent a user of the computer 104 from determining communication mode preferences of the user of user compute 102. For example, a user of the user computer 102 may prefer not to communication via video conference, and therefore may desire to assert a not available status as to video conferencing while remaining available with regard to other communication modes. Aggregation of presence may result in assertion of not available presence status as to all communication when only not available as to a single communication mode is desired. Embodiments of the present disclosure allow for distribution of presence status as to a specific communication application (e.g., video conferencing), thereby allowing a user to ascertain communication mode preferences of another user.

The communication programming included on the user computers 102, 104 comprises communication application A 114 and communication application B 112. Communication application A 114 may be a client of the communication server 106 and provide support for a variety of communication modes. Correspondingly communication application A 114 may provide a variety of availability status, device status, etc. to the communication server 106. Communication application B 112 may be a limited functionality client of the communication server 106 providing, for example, communication only by video conferencing.

To facilitate communication between the user computers 102, 104, embodiments of the communication server computer 106 store and provide presence information 108 to the communication applications 112, 114. In some embodiments, the presence information 108 may comprise a contact list (i.e., a buddy list) cataloging users (and corresponding user presence status) with whom a user of the contact list may communicate. The presence information 108 may be based on presence information provided by the communication applications 112, 114. The communication applications 112, 114 may periodically provide presence status updates to the server 106 for inclusion in the presence information 108. Similarly the communication applications 112, 114 may periodically receive presence updates (i.e., presence information 108) from the server 106. Each of the communication applications 112, 114 can refer to the presence information 108 provided by the server 106 to determine the presence status of a different user (i.e., a user of the other communication application 112, 114). Thus, if a user of the user computer 102 desires to initiate a communication with a user of the user compute 104, the presence information 108 transferred to the user computer 102 by the server 106 can provide an indication of the availability and willingness of the user of the user computer 104 to communicate.

In some embodiments, a presence monitoring program included in the application programs 112, 114 automatically collects and reports user presence status based on user activities. For example, the presence monitoring program may ascertain user presence based on keystrokes, pointer movement, telephone use, calendar information such as scheduled appointments, etc.

The presence information 108 stored on the communication server 108 comprises aggregate presence information 116 and application specific presence information 118. Aggregate presence information 116 may be generated by the communication server 106 based on presence information (e.g., user presence status, communication device state, etc.) provided to the server 106 by the communication application A 114. Application specific presence information 118 may be stored by the communication server 106 as provided by the communication application B 112 free from aggregation processing. Thus, based on the presence information 108 provided by the communication server 106, each of the communication applications 112, 114 can determine user availability without regard for the availability status applicable to the other communication application 112, 114. For example, if the communication application B 112 provides video conferencing or any set of communication modes, then the application specific presence 118 can be used to determine whether a user is available for video conferencing or other communication via the communication application B 112. Availability for video conferencing via communication application B 112 has no effect on presence status as to other communication modes provided by the communication application A 114. Availability status for other communication modes remains combined in aggregate presence 116 undistorted by video conference presence status.

In some embodiments, the user computer 102 may be local to the user. For example, the user computer 102 may be a notebook or desktop computer with which the user directly interacts (e.g., by typing on the computer 102 keyboard, viewing information provided on a display of the computer 102, etc.).

In some embodiments, the user computer 102 may be remote from the user. For example, the computer 102 may be a blade computer, a server computing session, or other computing platform or computing capability provided to the user for execution of application programs 112, 114. In such embodiments, the user may interact with the user computer 102 via a local client device 122 (e.g., a thin client, personal computer, etc.) configured to provide a communication capability used by a communication application 112, 114 executing on the user computer 102. For example, if communication application B 112 on user computer 102 supports video conferencing, and communication via video conferencing is to be supported by the local client device 122 coupled to the user computer 102, the local client device 122 can provide video capture and video display capability while other operations of the communication application B 112 are provided by the remote user computer 102. The user computer 102 may be coupled to the local client device 122 via a network, for example, the network 110 described above or equivalent.

Figure 2:
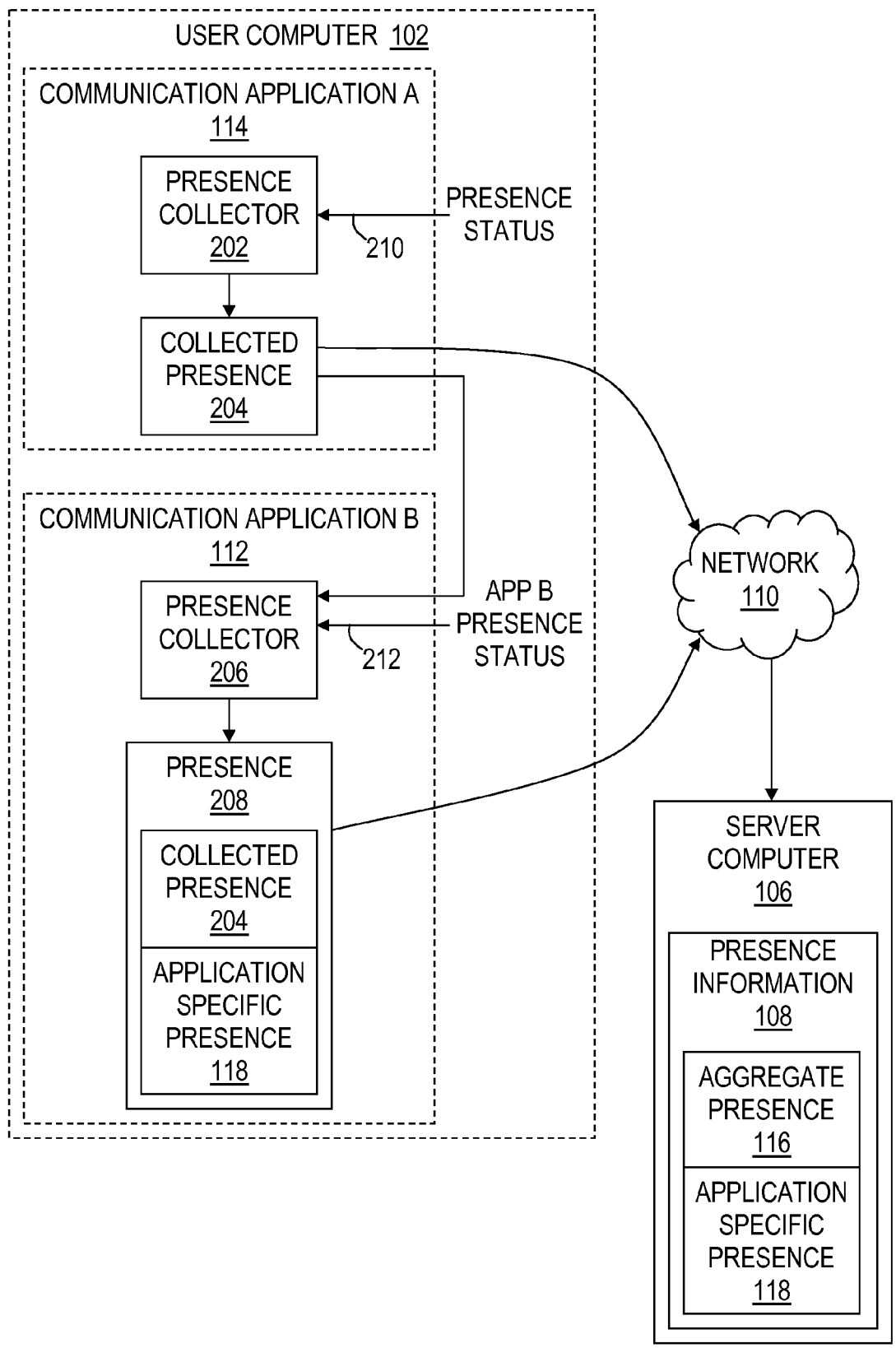
FIG. 2 shows a block diagram of a computer configured to provide application specific presence in accordance with various embodiments.

FIG. 2 shows a block diagram of a computer 102 configured to provide application specific presence 118 in accordance with various embodiments. Communication application A 114 comprises a presence collector 202 that gathers presence status 210 from various sources (e.g., user presence selections, user operations such as keystrokes, communication device status, user schedule information, etc.) to generate a collected presence 204. The collected presence comprises presence information used to construct aggregate presence 116 in the server 106. Communication application A 114 may provide the collected presence 204 to the server 106 via the network 110 for inclusion in the aggregated presence 116.

Communication application B 112 comprises presence collector 206. The presence collector 206 retrieves the collected presence 204 generated by the communication application A 114 and appends to the collected presence 204, presence information specific to the communication application B 112 (i.e., application specific presence 118) to generate presence information 208. Communication application B 112 sends the presence 208 to the communication server 106 via the network 110. The server 106 generates aggregate presence 116 based on collected presence 204 and separately maintains application specific presence 118. Presence status 212 collected to generate the application specific presence 118 may comprise user entered presence specific to communication application B 112, device status (e.g., video camera status), and other presence status pertaining specifically to communication application B 112. The presence collector 206 may include an internet protocol ("IP") address in the application specific presence 118. The IP address refers to the communication application B 112 in the user computer 102 and facilitates peer-to-peer communication between instances of the communication application B 112 in the user computers 102, 104. The presence collector 206 may also include in the application specific presence 118 an identification value that associates the application specific presence 118 with communication application B 112, a timestamp value that can be used to determine the age of the application specific presence 118 and other information.

In some embodiments of the system 100, the presence information provided to the server may include fields allowing a user of the computer 102 to include user specific information (i.e., "user fields"). For example, a user may include information regarding why he is currently unavailable and/or when he is likely to become available for communication. Embodiments of communication application B 112 include the application specific presence information 118 in fields provided for such user specific information. The application specific information 118 may be encoded in a user field in such as way as to allow communication application B 112 receiving presence information 108 from the server 106 to identify the application specific presence 118 contained therein. Other clients, for example communication application A 114, are not configured to decode the user field containing application specific presence 118 and may ignore it. Thus, embodiments of communication application B 112 provide and use application B 112 specific presence information 118 while maintaining compatibility with communication systems 100 (e.g., MSOCS) not configured to publish or subscribe to application specific presence.

Figure 3:
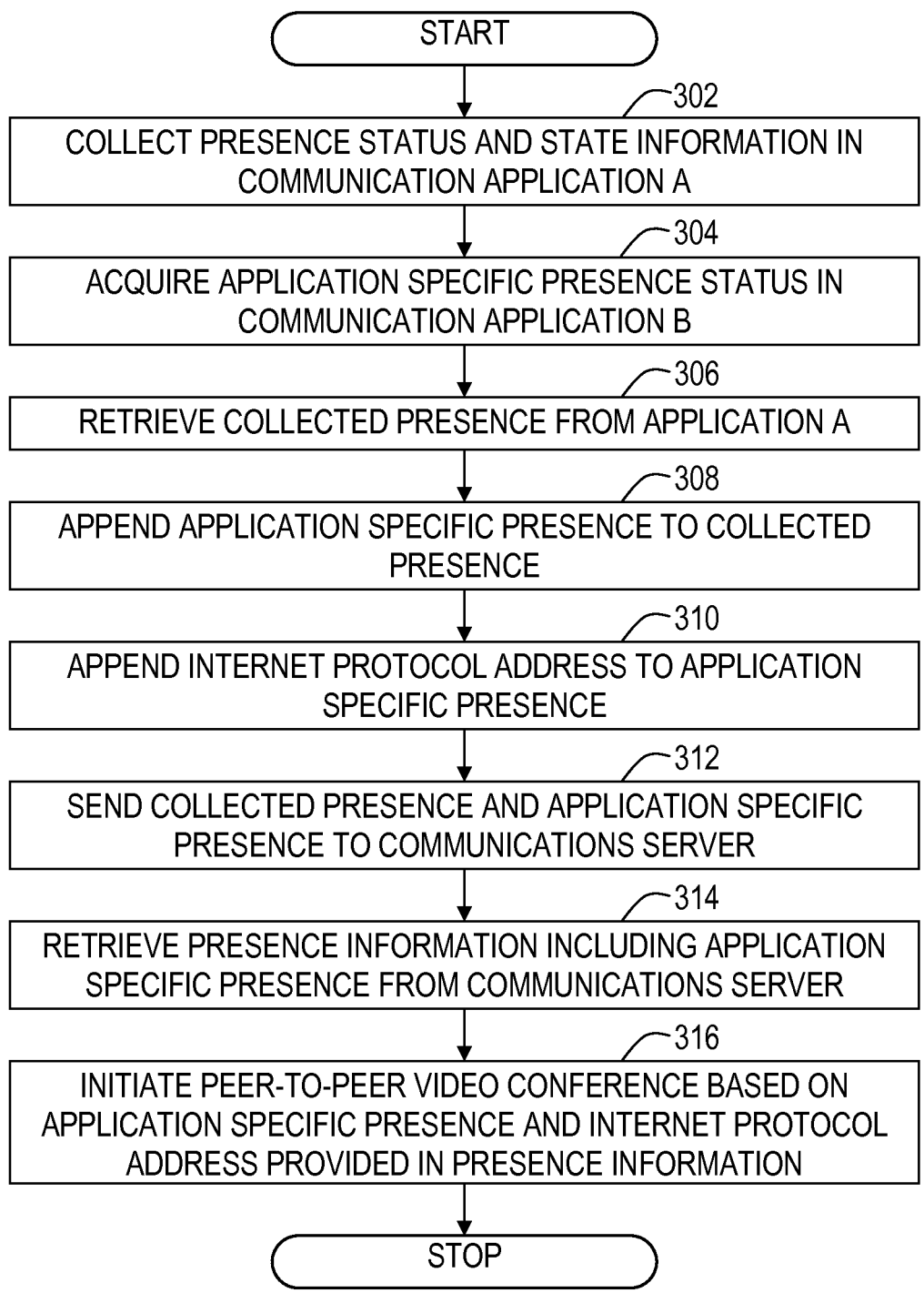
FIG. 3 shows a flow diagram for a method for providing and using application specific presence in accordance with various embodiments.

FIG. 3 shows a flow diagram for a method for providing and using application specific presence in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in the communication application B 114 program software executed by one or more processors included in the user computer 102.

In block 302 the user computer 102 is operational. The communication applications 112, 114 are being executed by the computer 102 and are configured to provide communication services to a user of the computer 102. The communications applications 112, 114 are providing presence information to and receiving presence information from the communications server 106. Communication application A 114 may provide presence information based a plurality of communication modes. Consequently, communication application A 114 collects presence status and presence state information, including user provided presence information and communication device state information to be sent to the server 106.

In some embodiments, communication application B 112 may be a limited functionality communication client. For example, the communication application B 112 may support only a single communication mode (e.g., video conferencing). In some embodiments, the communication application B 112 may support a plurality of communication modes. Embodiments of communication application B 112 are configured to provide and use application specific presence information that is not aggregated with presence information provided by communication application A 114. In block 304, communication application B 112 collects presence status specifically related to the communication application B 112. For example, if the communication application B 112 provides only video conferencing, then communication application B may collect presence status related to a user's availability of participate in a video conference and the readiness of video conferencing devices (e.g., video cameras). In some embodiments, the presence collector 206 collects presence status applicable to any communication mode provided by the communication application B 112.

In block 306, communication application B 112 retrieves the presence information collected by communication application A 114. In some embodiments, the retrieval is performed via intra-computer 102 communications between the communication applications 112, 114.

In block 308, communication application B 112 appends the application specific presence information 118 to the presence information collected by communication application A 114. In some embodiments, communication application B 112 encodes the application specific presence information 118 as user property fields specified by for use with presence information passed between communication application A 114 and the communication server 106. In some embodiments the application specific presence information is provided in extensible markup language ("XML").

In block 310, communication application B 112 adds an internet protocol ("IP") address to the application specific presence information 118 provided to the server 106. The IP address refers to the communication application B 112 in user computer 102 and may be used by application 112 in computer 104 to initiate a peer-to-peer communication session with the application 112 in computer 102.

In block 312, the communication application B sends the presence information 208 which includes presence information 204 collected by communication application A 114, and application specific presence information 118 to the server 106. The server 106 processes the presence information 204 to generate aggregated presence 116. The application specific presence 118 is not aggregated with other presence information, but rather is maintained separately from other presence information. In some embodiments, the communication application A 114 also sends the collected presence 204 to the server 106 for aggregation.

In block 314, communications application B on user computer 104 retrieves, from the server 106, the presence information 108 pertinent to a user of the computer 102. The presence information 108 includes the aggregated presence information 116 and the application specific presence information 118.

In block 316, a user of the computer 104 causes communication application B 112 executing on the computer 104 to initiate a communication session, for example, a peer-to-peer communication session (e.g., a video conference), with a user of the computer 102 via communication application B 112 executing on the computer 102. The initiation of the communication session may be based on the application specific presence information 118 including the IP address provided by communication application B 112 executing on the user computer 102.

The above discussion is meant to be illustrative of the principles and various embodiments of the present invention. Numerous variations and modifications will become apparent to those skilled in the art once the above disclosure is fully appreciated. For example, while embodiments have been described as providing application specific presence information via user fields provided in the presence transfer protocol, those skilled in the art will understand that information other than application specific presence information can be transferred between communication server clients using the methods described herein. Further, while video conferencing has been mentioned as an exemplary communication mode provided by an embodiment of a communication application providing and using application specific presence information, some may provide a variety of communication modes. It is intended that the following claims be interpreted to embrace all such variations and modifications.

What is claimed is:

1. A system, comprising:
   one or more processors; and
   a first communication program executable by the one or more processors to provide a first mode of user communication; and
   a second communication program executable by the one or more processors to provide a second mode of user communication;
   wherein the second communication program causes the one or more processors to provide presence information to a communication server;
   wherein the presence information provided by the second communication program comprises a presence status provided by the first communication program and a separate presence status provided by the second communication program; and
   wherein the separate presence status provided by the second communication program is configured to avoid aggregation with any other presence status by the communication server.

2. The system of claim 1, wherein the second communication program is a video conferencing program.

3. The system of claim 1, wherein the second communication program is configured to cause the one or more processors to retrieve presence status from the first communication program prior to providing presence information to the communication server.

4. The system of claim 1, wherein the presence information provided by the second communication program comprises an internet protocol ("IP") address associated with the second communication program.

5. The system of claim 1, wherein the presence status provided by the second communication program is provided to the communication server in a user specific information field related to the first communication program.

6. The system of claim 1, wherein the second communication program causes the one or more processors to receive presence information from the communications server, the presence information comprising:
   a first field indicating whether a user is available for communication via the second communication program; and
   a second field indicating whether a user is available for communication via the first communication program.

7. The system of claim 6, wherein the second communication program causes the one or more processors initiate a communication session with the user based on the indication of the first field.

8. The system of claim 6, wherein the first communication program causes the one or more processors to initiate a communication with the user based on the indication of the second field.

9. The system of claim 7, wherein the first field comprises an IP address usable to communicate with the user, and the second communication program is configured to cause the one or more processors to initiate a peer-to-peer communication using the IP address.

10. A non-transitory computer-readable medium encoded with a computer program comprising:
    instructions for a first inter-user communication program that when executed cause one or more processors to generate a first presence status of a user;
    instructions for a second inter-user communication program that when executed cause the one or more processors to retrieve the first presence status from the first communication program;
    instructions for the second communication program that when executed cause the one or more processors to determine a second presence status of the user with regard to the second communication program;
    instructions for a second communication program that when executed cause the one or more processors to send the first presence status and the second presence status to a communications server, the second presence status configured to avoid aggregation with other presence status in the communications server.

11. The non-transitory computer-readable medium of claim 10, further comprising instructions for the first communication program that when executed cause the one or more processors to regard the second presence status as non-presence information.

12. The non-transitory computer-readable medium of claim 10, further comprising instructions for causing the one or more processors to provide an internet protocol ("IP") address associated with the second communication program as part of the second presence status.

13. The non-transitory computer-readable medium of claim 10, further comprising instructions for causing the one or more processors to provide the second presence status as an item of user information related to the first presence status.

14. The non-transitory computer-readable medium of claim 10, further comprising instructions for causing the one or more processors to receive presence information from the communication server, the presence information comprising:
    a first field indicating whether a user is available for communication via the second communication program; and
    a second field indicating whether a user is available for communication via the first communication program.

15. The non-transitory computer-readable medium of claim 14, further comprising instructions for causing the one or more processors to initiate a communication session with the user based on the indication of the first field.

16. The non-transitory computer-readable medium of claim 14, further comprising instructions for causing the one or more processors to initiate a peer-to-peer communication session with the user using an IP address received in the first field.

17. A method, comprising:
    retrieving, by one or more processors, a first presence status of a user determined by a first communication program, executing on the one or more processors, from the first communication program;
    determining, by the one or more processors, independently of the first presence status, a second presence status of the user with regard to a second communication program;
    sending, by the one or more processors, a combined presence status, generated by execution of the second communication program, to a communications server, the combined presence status comprising the first presence status and the second presence status, the second presence status configured to avoid aggregation with other presence status in the communications server.

18. The method of claim 17, further comprising providing an internet protocol ("IP") address associated with the second communication program as part of the second presence status.

19. The method of claim 17, further comprising receiving presence information from the communication server, the presence information comprising:
    a first field indicating whether a user is available for communication via the second communication program; and
    a second field indicating whether a user is available for communication via the first communication program.

20. The method of claim 19, further comprising initiating a peer-to-peer communication session with the user based on an IP address received in the first field.

* * * * *